United States Patent [19]
Bae

[11] Patent Number: 5,623,346
[45] Date of Patent: Apr. 22, 1997

[54] SYNCHRONIZATION SIGNAL SHARING CIRCUIT OF DIGITAL VCR

[75] Inventor: Jum H. Bae, Suweon, Rep. of Korea

[73] Assignee: SamSung Electronics Co., Ltd., Suwon, Rep. of Korea

[21] Appl. No.: 288,251

[22] Filed: Aug. 9, 1994

Related U.S. Application Data

[63] Continuation of Ser. No. 457,860, Dec. 27, 1989, abandoned.

[30] Foreign Application Priority Data

May 26, 1989 [KR] Rep. of Korea ................ 7062/1989

[51] Int. Cl.⁶ .............................. H04N 5/782; H04N 5/45
[52] U.S. Cl. ................................. 386/1; 348/565
[58] Field of Search ....................... 358/310, 335; 360/33.1, 32; 348/506, 565, 566, 567, 568, 564, 705; H04N 5/782, 5/45

[56] References Cited

U.S. PATENT DOCUMENTS

| | | | |
|---|---|---|---|
| 3,702,898 | 11/1972 | Webb | 348/705 |
| 4,101,926 | 7/1978 | Dischert et al. | 348/506 |
| 4,238,773 | 12/1980 | Tsuboka et al. | 348/568 |
| 4,290,082 | 9/1981 | Hirai | 358/328 |
| 4,500,930 | 2/1985 | Hamalainen et al. | 358/310 |
| 4,654,711 | 3/1987 | Mikado | 358/22 |
| 4,777,531 | 10/1988 | Hakamada et al. | 358/183 |
| 4,809,072 | 2/1989 | Poke | 358/183 |
| 4,814,876 | 3/1989 | Horio et al. | 358/906 |
| 4,823,183 | 4/1989 | Jackson et al. | 358/22 |
| 4,839,728 | 6/1989 | Casey | 358/183 |
| 4,890,168 | 12/1989 | Inoue et al. | 358/335 |
| 4,920,425 | 4/1990 | Sekimoto et al. | 358/334 |
| 4,953,027 | 8/1990 | Tong et al. | 358/183 |
| 4,991,012 | 2/1991 | Yoshino | 358/183 |
| 5,032,926 | 7/1991 | Imai et al. | 358/335 |
| 5,040,067 | 8/1991 | Yamazaki | 358/183 |

OTHER PUBLICATIONS

Gordon McComb, Video Magic, Sep. 1987, pp. 71–74, Popular Science.

*Primary Examiner*—Thai Q. Tran
*Assistant Examiner*—Huy Nguyen
*Attorney, Agent, or Firm*—Robert E. Bushnell, Esq.

[57] ABSTRACT

A picture in picture video signal processing circuit does not need an extra synchronization generator because sub picture video signals are synchronized with the main picture video signals by storing decoded sub picture video signals in a memory then reading the decoded sub picture video signals out in response to synchronization signals of the main picture video signal. Further, the memory can be of a lower capacity owing to the fact that the synchronization signals of the sub picture video signal are not stored.

26 Claims, 2 Drawing Sheets

MULTI-PICTURE

SCREEN VERTICAL PARTITION

SYNCHRONIZATION SIGNAL SHARING CIRCUIT OF DIGITAL VCR

This is a continuation of application Ser. No. 07/457,860, filed 27, Dec. 1989 abandoned.

BACKGROUND OF THE INVENTION

1. Field of the Invention

The present invention is related to a synchronization signal sharing circuit of a digital video cassette recorder (VCR) which reduces the memory capacity requirements of the digital VCR and does not need a synchronization signal generator in the video machinery and tools which change a video signal into a digital signal for processing.

2. Description of the Prior Art

In the traditional digital VCR, either the method in which the whole video signal is stored in the memory and is read, or the more advanced method in which the synchronization signal part or the burst signal part, which is regular, is not stored in memory but only the actual visual part of the video signal is memorized in the memory, is used.

In the digital VCR's using these methods, there is a demerit of consuming a lot of the memory capacity if the former method is used, and there is a demerit of needing a special synchronization generator because the synchronization signal received from the outside by the memory is not saved if the latter method is used.

SUMMARY OF THE INVENTION

One object of present invention is to provide a digital VCR which does not need a synchronization generator even though the later method is used.

Another object of the present invention is to provide a digital VCR, which avoids a need for a synchronization generator by sharing the synchronization signal through a method in which only the visual part of a sub video signal is memorized and the synchronization signal is received from a main video signal.

DETAILED DESCRIPTION OF THE INVENTION

Figure 1:
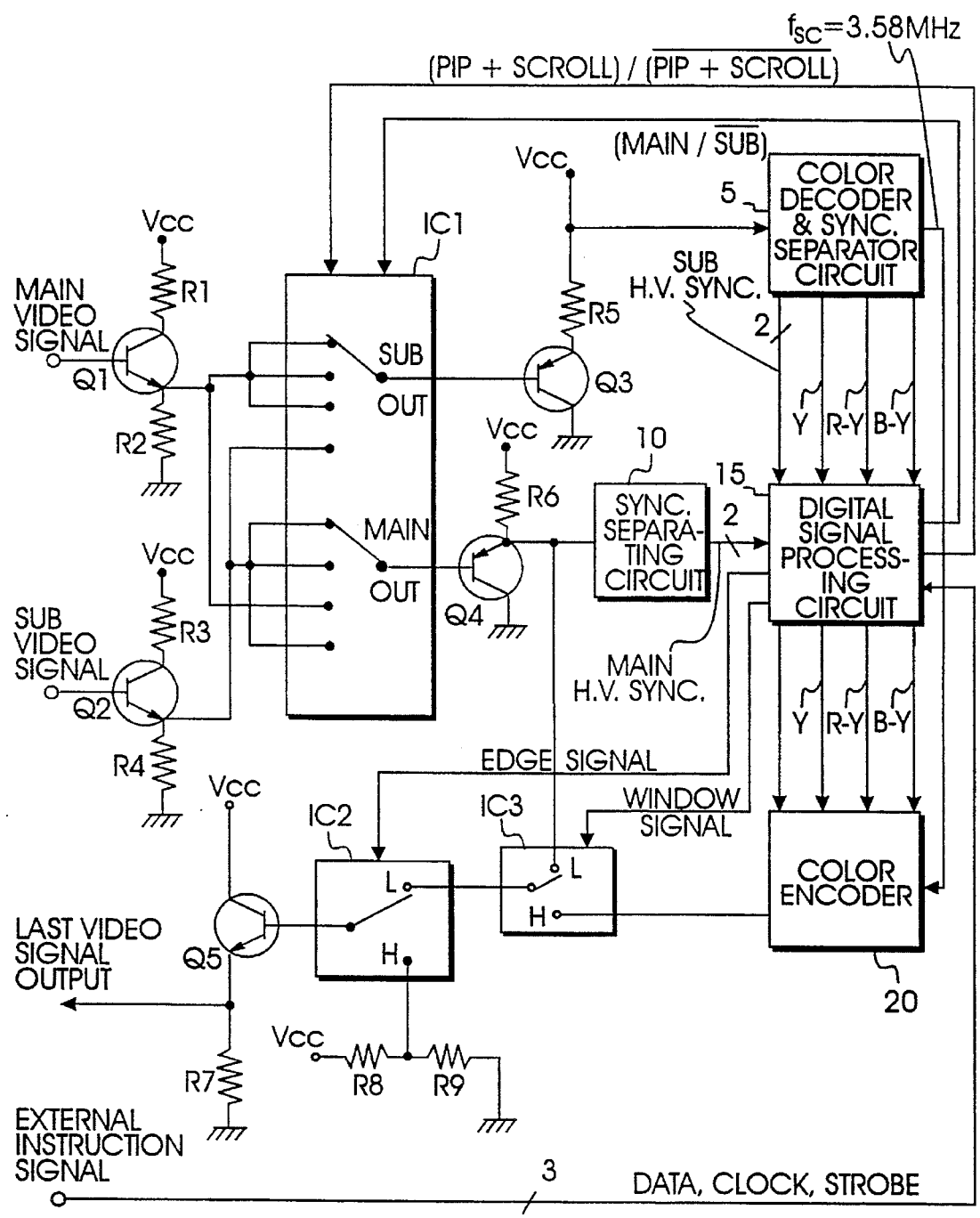
FIG. 1 is the circuit diagram of the present invention.

The present invention is described in reliance upon the accompanying figures, as follows:

The dual 4 channel multiplexer IC1 switches over the main video signal and the sub video signal applied through the transistors Q1 and Q2 according to the logic signals (PIP+SCROLL/PIP+SCROLL)(Main/Sub) which select the multi picture (PIP) mode or the screen vertical partition (SCROLL) mode. The color decoder and synchronization separating circuit 5 separates the color signal and the synchronization signal to process the sub video signal received from the multiplexer IC1. The digital signal processing circuit 15 enables the video signal received from the color decoder and synchronization separating circuit 5 to be stored and receives the main video signal from the multiplexer IC1 through the synchronization separating circuit 10. The color encoder 20 receives the video signal which is processed as a digital signal in the digital signal processing circuit 15. The multiplexer IC3 is switched by the window signal of the digital signal processing circuit 15 and selects between the main video output and the color encoder 20 output. The multiplexer IC2 emphasizes the edge of the viewing window by switching in response to the edge signal of the digital signal processing circuit 15.

Resistors R8 and R9 which control the brightness of the edge are connected to the multiplexer IC2. The last video output of the multiplexer IC2 is delivered through the transistor Q5. The instruction signal (data, clock and strobe signal) received from the outside is delivered to the digital signal processing circuit 15 to control its operation.

In the present invention constructed as described above, the main video signal and the sub video signal are input into the dual 4 channel multiplexer IC1 through the transistors Q1 and Q2 serving as buffers and, in the multiplexer IC1, the main video signal and the sub video signal are selected according to the logic signal supplied from the digital processing circuit 15.

At this time in the multiplexer IC1, the state of the main output (Main Out) and the sub output (Sub Out) are selected according to the logic signal (PIP+SCROLL/PIP+SCROLL)(Main/Sub) of the digital processing circuit 15 as follows:

| PIP+SCROLL (PIP+SCROLL) | Main/Sub | Main/Out | Sub Out |
| --- | --- | --- | --- |
| 0 | 0 | Main Video | Main Video |
| 0 | 1 | Main Video | Main Video |
| 1 | 0 | Sub Video | Main Video |
| 1 | 1 | Main Video | Sub Video |

Here, the (PIP+SCROLL)signal is "high level" during the multi picture (PIP) or the screen vertical partition (SCROLL) modes, and otherwise is at a "low level".

The logic signal (Main/Sub) which selects the main/sub screen is a meaningful value only during the multi picture or the screen vertical partition modes. The (Main/Sub) signal causes the main screen and the supplementary screen to switch with each other.

When the logic signal (Main/Sub) is applied at a high level, the main video signal is displayed as the main screen of the multi picture (PIP) screen and the sub video signal is displayed as the supplementary screen, and when the logic signal (Main/Sub) is applied at a low level, it is displayed contrary to the above.

These logic signals (PIP+SCROLL/PIP+SCROLL) and (Main/Sub) are generated by the digital signal processing part 15 in response to the external instruction signal.

Accordingly, because only one video signal is read after it is entered into the memory and digitally processed when the logic signal (PIP+SCROLL) is low level, or when it is neither multi picture (PIP) nor screen vertical partition (SCROLL) mode, there is the necessity of unifying the main output and the sub output of the multiplexer IC1 to the main video signal in the case when it is neither multi picture nor screen vertical partition.

Therefore, as in the table, the main video signal is delivered with both the main output and the sub output of the multiplexer IC1 without regard to the logic signal (Main/Sub) when the logic signal (PIP+SCROLL/PIP+SCROLL) is at a low level.

If the logic signal (Main/Sub) is at a high level, the main video signal is delivered to the main output of the multiplexer IC1 and the sub video signal to the sub output, and if at a low level, it is delivered contrary to the manner mentioned above.

The output video signal of the dual 4 channel multiplexer IC1 is provided through the switching transistors Q3 and Q4, respectively. The video signal delivered to the sub output is applied to the digital signal processing part 15 through the color decoder and synchronization separating circuit 5 and processed as a digital signal. The video signal delivered to the main output is applied to the digital signal processing circuit 15 through the synchronization separating circuit 10 and simultaneously applied to the multiplexer IC3 which is the analog signal processing path.

During either the multi picture (PIP) or the screen vertical partition (SCROLL) mode, either the multi picture or the screen vertical partition functions are executed by performing an operation which has the small screen signal overlap with the main screen signal. In these modes, the video signal delivered from the sub output of the multiplexer IC1 is synchronized with the vertical and horizontal synchronization signals of the main video signal by storing the video signal delivered from the sub output of the multiplexer IC1 in the memory of the digital signal processing circuit 15.

In either the multi picture (PIP) or the screen vertical partition (SCROLL) mode, either the multi picture or the screen vertical partition operation overlaps the supplementary screen signal with the main screen signal. The display is executed by having the video signal of the sub output synchronized to the vertical and the horizontal synchronization signals of the main video signal separated in the synchronization separation circuit 10 after the video signal of the sub output is memorized in the memory of the digital signal processing circuit 15 in response to the vertical and horizontal synchronization signals of the sub video signal separated in the color decoder and the synchronization separating circuit 5.

Accordingly, a special synchronization generator is not necessary in the present invention because the vertical and the horizontal synchronization signals of each of the sub video signal and the main video signal are used during storage of the sub video signal in the memory and reading the memorized sub video signal, respectively.

And the operation is not in either the multi picture or the screen vertical partition mode but in the digital mode of strobe, art and mosaic functions, operation is as follows:

When it is neither the multi picture (PIP) nor the screen vertical partition (SCROLL) mode the main vertical and horizontal synchronization signals and the sub vertical and horizontal synchronization signals become the same because the main video signal is delivered to both the main output and the sub output of the multiplexer IC1.

Accordingly, if the sub video signal is memorized in the memory on the basis of the sub synchronization signals and the picture is read from the memory on the basis of the main synchronization signals, the synchronization signal is automatically carried on the digitally processed picture to become the complete composite video signal.

In the digital mode when neither the multi picture nor the screen vertical partition mode is executed, the main synchronization signals and the sub synchronization signals are the same because the same main video signal is output from the multiplexer IC1, and the digitally processed picture becomes the complete composite synchronization signal and is carried on it.

And when it is either the multi picture or the screen vertical partition like the above, each screen is displayed clearly by outputting the window signal which shows the screen and the edge signal which indicates the edge pan from the digital signal processing circuit 15 and being applied to the multiplexer IC2.

At this time the window signal and the edge signal can be made with ease in the digital signal processing circuit 15 by giving the time delay in some degree on the basis of the horizontal synchronization signal, and the window signal and the edge signal are shown in FIG. 2.

And in the digital signal processing circuit 15, if the window signal and the edge signal are applied at a high level, the multiplexers IC2 and IC3 are connected to the terminal H, and if the window signal and the edge signal are applied at a low level, they are connected to the terminal L.

Also, the video signal through the transistor Q4 is applied to the terminal L of the multiplexer IC3 and the output of the color encoder 20 is applied to the terminal H of the multiplexer IC3. The resistors R8 and R9 control the brightness of the surrounding line formed by the edge signal. The resistors are connected to the terminal H of the multiplexer IC2 which the output of the multiplexer IC3 is applied to the terminal L of multiplexer IC2.

And the output of the multiplexer IC2 passes through the transistor Q5 to be delivered as the last video signal.

Accordingly, the multiplexers IC2 and IC3 are switched to the window signal and the edge signal applied as in FIG. 2 in the digital signal processing circuit 15 and constitute each screen.

Figure 2A:
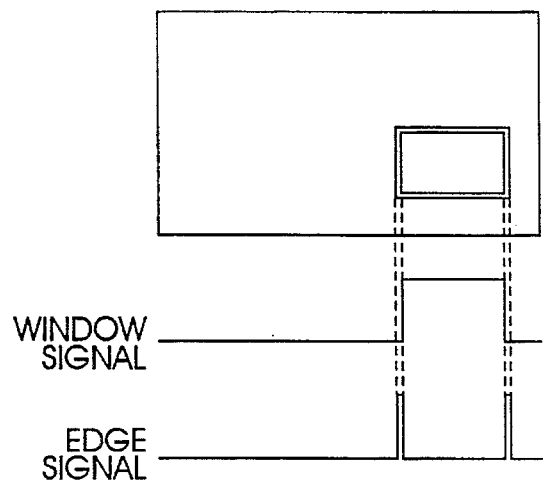
FIG. 2 is the waveform diagram of the window signal and the edge signal of the present invention.
Figure 2B:
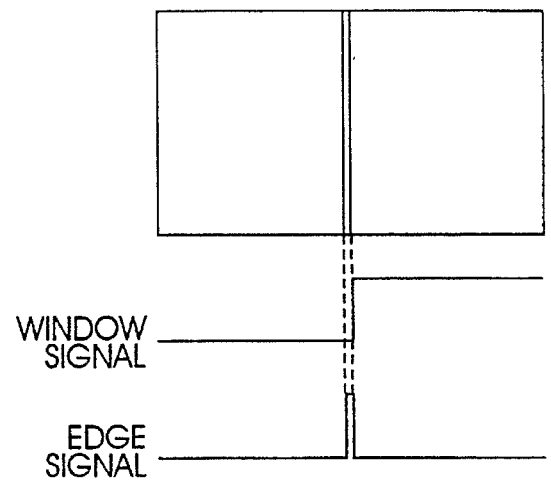
Figure 2C:
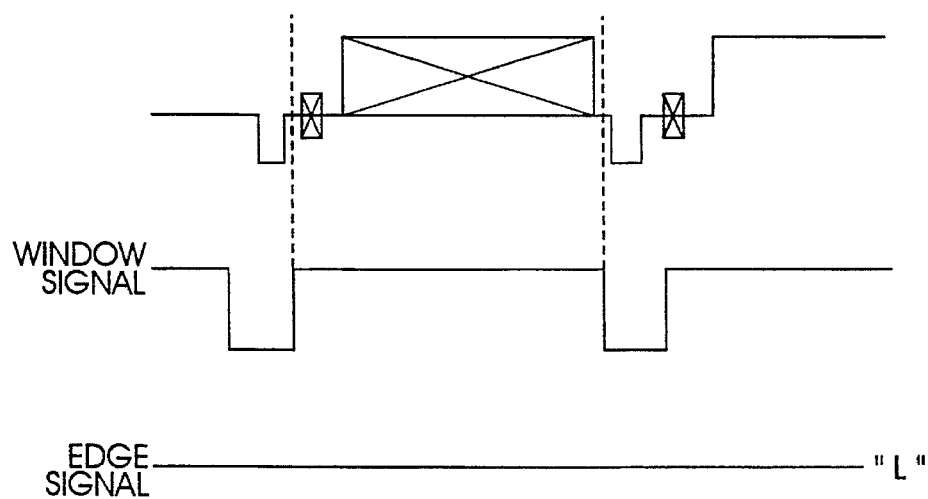

At this time, FIG. 2A shows the wave form of the window signal and the edge signal in the multi picture and FIG. 2B shows the wave form in the screen vertical partition, and FIG. 2C shows the waveform in the whole screen digital mode with neither the multi picture mode nor the screen vertical partition mode.

As is considered above, there is the advantage of the present invention that it is used compatibly in the multi picture (PIP) and the screen vertical partition (SCROLL) modes and in the other digital mode, and the capacity of the memory is also reduced by not memorizing the synchronization signals of the sub video signal, and the special synchronization generator is not necessary because memorizing is done by the sub synchronization signals and reading is done by the main synchronization signals.

I claim:

1. A picture-in-picture video signal generating circuit, said circuit comprising:

a first dual four channel multiplexer for providing input video signals as a main video signal and a sub video signal according to logic signals;

a synchronization separation circuit for separating main video signal horizontal and vertical synchronization information from said main video signal;

a color decoder and synchronization separation circuit for decoding said sub video signal and separating sub video signal vertical and horizontal synchronization information from sub video signal color and luminance information:

a digital signal processing circuit for generating said logic signals, and for processing and storing said sub video signal color and luminance information in a memory without storing said sub video signal vertical and horizontal information in said memory, said sub video signal color and luminance information being stored in said memory in synchronization with said sub video signal vertical and horizontal synchronization information, said digital signal processing circuit synchronously providing said sub video signal color and luminance information during a read operation in synchronization with said main video signal horizontal and vertical synchronization information;

a color encoder for encoding said sub video signal color and luminance information processed by said digital signal processing circuit; and a second multiplexer for providing said main video signal combined with said sub video signal color and luminance information encoded by said color encoder.

2. A circuit as claimed in claim 1, wherein said first dual four channel multiplexer provides said main video signal and said sub video signal to said synchronization separation circuit and said color decoder and synchronization separation circuit, respectively, through buffer transistors.

3. A picture-in-picture video signal generating circuit, said circuit comprising:

a digital signal processing circuit for storing color signal and luminance signal components of a sub video signal in a memory without storing synchronizing signal components of said sub video signal in said memory, said color signal and luminance signal components of said sub video signal being stored in said memory in response to said synchronizing signal components of said sub video signal;

a first multiplexer, controlled by logic signals from said digital signal processing circuit, for receiving input video signals and providing said input video signals as a main video signal and said sub video signal;

a color decoder and synchronization separating circuit coupled between said digital signal processing circuit and said first multiplexer, for delivering said sub video signal from said first multiplexer to said digital signal processing circuit;

a synchronization separating part coupled between said digital signal processing circuit and said first multiplexer, for delivering synchronizing signal components of said main video signal from said first multiplexer to said digital signal processing circuit;

a color encoder coupled to receive said color and luminance signal components of said sub video signal from said digital signal processing circuit, said color and luminance signal components of said sub video signal being read out from said digital signal processing circuit in response to said synchronizing signal components of said main video signal;

a second multiplexer for generating a combined signal by selectively providing one of said main video signal provided by said first multiplexer and said color and luminance signal components of said sub video signal encoded by said color encoder, in response to a window signal from said digital signal processing circuit; and a third multiplexer for generating a last video signal by selectively providing one of said combined signal generated by said second multiplexer and a brightness control signal in response to an edge signal from said digital signal processing circuit.

4. A circuit as claimed in claim 3, wherein said main video signal and said sub video signal pass through a first buffer transistor and a second buffer transistor, respectively, before being received by said first multiplexer.

5. A circuit as claimed in claim 3, wherein said brightness control signal is generated by a voltage divider comprising a plurality of resistors.

6. A method for generating a picture-in-picture video signal in a video system, said method comprising the steps of:

providing in response to logic signals, a main video signal and sub video signal;

separating a color signal component, a luminance signal component, and synchronization signal components from said sub video signal;

separating synchronization signal components from said main video signal;

digitally processing and temporarily storing said color signal component and said luminance signal component of said sub video signal in a memory without storing said synchronization signal components of said sub video signal, said color and luminance signal components of said sub video signal being stored in said memory in response to said synchronization signal components of said sub video signal, and then reading out said color signal component and said luminance signal component of said sub video signal from said memory in response to said synchronization signal components of said main video signal;

generating a window signal indicating placement of said sub video signal in said main video signal and an edge signal for highlighting edge regions of said sub video signal;

color encoding the temporarily stored said color signal component and said luminance signal component of said sub video signal to generate an encoded video signal; and providing one of said main video signal, a brightness signal and said encoded video signal based on said window signal and said edge signal, said brightness signal for providing a solid border for said encoded video signal.

7. A method as claimed in claim 6, wherein said logic signals are generated in response to an outer instruction signal.

8. A picture-in-picture video signal generating circuit, comprising:

means for selectively providing input video signals as main video signals and sub video signals according to a logic signal;

means for separating sub luminance signal components, sub color signal components, first vertical synchronization signal components and first horizontal synchronization signal components from said sub video signals;

means for separating second vertical synchronization signal components and second horizontal synchronization signal components from said main video signals;

means for storing said sub luminance signal components and said sub color signal components as digital video signals without storing said first vertical and said first horizontal synchronization signal components, said sub luminance and sub color signal components being stored in synchronization with said first vertical synchronization signal components and said first horizontal synchronization signal components, for reading out said digital video signals as stored luminance signal components and stored color signal components in synchronization with said second vertical synchronization signal components and said second horizontal synchronization signal components, for generating a window signal indicative of a position for placing said sub video signals within said main video signals, and for generating said logic signal;

means for encoding said stored luminance signal components and said stored color signal components to regenerate said sub video signals; and means for generating combined video signals comprising said main video signals with said sub video signals regenerated by said encoder means in a window defined within said main video signals by said window signal with a border of said window being controlled by an edge signal.

9. The circuit of claim 8, further comprising:

means for buffering the input of said providing means;

means for buffering the output of said providing means; and means for controlling the brightness of the border formed by the edge signal.

10. A picture-in-picture video signal generating circuit for a video tape recorder, said circuit comprising:

means for selectively providing received video signals received from an external source as main picture composite video signals and sub picture composite video signals;

means for decoding said sub picture composite video signals to generate sub picture decoded video signal components and sub picture synchronizing signal components;

means for separating main picture synchronizing signal components from said main picture composite video signals;

digital processing means for storing said sub picture decoded video signal components in a memory without storing said sub picture synchronizing signal components in said memory, said sub picture decoded video signal components being stored in said memory in response to said sub picture synchronizing signal components, said digital processing means then providing the stored said sub picture decoded video signal components during a read operation in response to said main picture synchronizing signal components;

means for encoding the stored sub picture decoded video signal components provided by said digital processing means to generate sub picture encoded video signals; and means for combining said sub picture encoded video signals and said main picture composite video signals to generate combined composite video signals representing a main picture being a function of said main picture composite video signals and representing a sub picture being a function of said sub picture encoded video signals.

11. A circuit as claimed in claim 10, further comprising means for emphasizing a border between said main picture and said sub picture by mixing a constant voltage signal into said combined composite video signals.

12. A circuit as claimed in claim 10, wherein said means for selectively providing comprises a multiplexer responsive to a picture-in-picture enable signal provided by said digital processing means.

13. A circuit as claimed in claim 10, further comprising buffering transistors for buffering said main picture composite video signals and said sub picture composite video signals provided to said separating means and said decoding means, respectively.

14. A picture-in-picture video signal generating circuit for a video tape recorder, said circuit comprising:

means for selectively providing received video signals received from an external source as main picture composite video signals and sub picture composite video signals;

means for decoding said sub picture composite video signals to generate sub picture luminance signal components of said sub picture composite video signals, sub picture color-difference signal components of said sub picture composite video signals, and sub picture synchronizing signal components of said sub picture composite video signals;

means for separating main picture synchronizing signal components from said main picture composite video signals;

digital processing means for storing said sub picture luminance signal components of said sub picture composite video signals and said sub picture color-difference signal components of said sub picture composite video signals without storing said sub picture synchronizing signal components of said sub picture composite video signals, said sub picture luminance and color-difference signal components being stored in response to said sub picture synchronizing signal components generated by said decoding means, said digital processing means then providing the stored said sub picture luminance signal components and the stored said sub picture color-difference signal components as sub picture delayed luminance signal components and sub picture delayed color-difference signal components during a read operation in response to said main picture synchronizing signal components;

means for encoding said sub picture delayed luminance signal components and said sub picture delayed color-difference signal components provided by said digital processing means to generate sub picture encoded video signals; and means for combining said sub picture encoded video signals and said main picture composite video signals to generate combined composite video signals representing a main picture being a function of said main picture composite video signals and representing a sub picture, spatially positioned within said main picture, being a function of said sub picture encoded video signals.

15. A circuit as claimed in claim 14, further comprising means for emphasizing a border between said main picture and said sub picture by mixing a constant voltage signal into said combined composite video signals.

16. A circuit as claimed in claim 14, wherein said means for selectively providing comprises a multiplexer responsive to a picture-in-picture enable signal provided by said digital processing means.

17. A circuit as claimed in claim 14, further comprising buffering transistors for buffering said main picture composite video signals and said sub picture composite video signals provided to said separating means and said decoding means, respectively.

18. A method for generating a picture-in-picture video signal in a video system, said method comprising the steps of:

selectively providing in response to a logic signals, main video signals and sub video signals as input video signals;

separating sub luminance signal components, sub color signal components, first vertical synchronization signal components and first horizontal synchronization signal components from said sub video signals;

separating second vertical synchronization signal components and second horizontal synchronization signal components from said main video signals;

storing said sub luminance signal components and said sub color signal components as digital video signals without storing said first vertical and horizontal synchronization signal components, said sub luminance and sub color signal components being stored in synchronization with said first vertical synchronization signal components and said first horizontal synchronization signal components;

reading said digital video signals as stored luminance signal components and stored color signal components in synchronization with said second vertical synchronization signal components and said second horizontal synchronization signal components;

generating a window signal indicative of a position for placing said sub video signals within said main video signals;

encoding said stored luminance signal components and said stored color signal components to regenerate said sub video signals; and generating combined video signals comprising said main video signals with said sub video signals in a window defined within said main video signals by said window signal with placement of a border of said window being controlled by an edge signal.

19. The method for generating a picture-in-picture video signal as claimed in claim 18, further comprised of controlling brightness of said border formed by said edge signal.

20. The method for generating a picture-in-picture video signal as claimed in claim 18, further comprised of buffering said main video signals and said sub video signals prior to said separating steps.

21. The method for generating a picture-in-picture video signal as claimed in claim 18, further comprised of buffering said input video signals prior to said selectively providing step.

22. A picture-in-picture video signal generating circuit for a video tape recorder, said circuit comprising:

means for providing a main video signal and sub video signal in response to logic signals;

means for separating color signal components, luminance signal components, and synchronization signal components from said sub video signal;

means for separating synchronization signal components from said main video signal;

means for digitally processing and temporarily storing said color signal components and said luminance signal components of said sub video signal in a memory without storing said synchronization signal components of said sub video signal, said color signal components and luminance signal components of said sub video signal being stored in said memory in response to said synchronization signal components of said sub video signal, said color signal component and said luminance signal components of said sub video signal being read from said memory in correspondence with said synchronization signal components of said main video signal;

means for generating a window signal indicating placement of said sub video signal in said main video signal, and for generating an edge signal for highlighting edge regions of said sub video signal;

means for color encoding said color signal components and said luminance signal components of said sub video signal to generate an encoded video signal; and means for providing one of said main video signal, a brightness signal and said encoded video signal based on said window signal and said edge signal, said brightness signal providing a solid border for said encoded video signal.

23. The picture-in-picture video signal generating circuit as claimed in claim 22, further comprised of means for buffering said main video signal prior to separating said synchronization signal components from said main video signal.

24. The picture-in-picture video signal generating circuit as claimed in claim 22, further comprised of means for buffering said sub video signal prior to separating said color signal component, said luminance signal component, and said synchronization signal components from said sub video signal.

25. The picture-in-picture video signal generating circuit as claims in claim 22, further comprised of said color signal components, said luminance signal components and said synchronization signal components being separated from said sub video signal prior to storing said color signal components and said luminance signal components of said sub video signal in said memory.

26. The picture-in-picture video signal generating circuit as claimed in claim 22, further composed of said synchronization signal components of said main video signal being separated from said main video signal prior to storing said color signal components and said luminance signal components of said sub video signal in said memory.

* * * * *